(12) United States Patent
Mauch

(10) Patent No.: US 10,607,178 B2
(45) Date of Patent: Mar. 31, 2020

(54) SHIPMENT PLANNING

(71) Applicant: Satori Software Inc., Seattle, WA (US)

(72) Inventor: Kimberly Michelle Mauch, Lynnwood, WA (US)

(73) Assignee: SATORI SOFTWARE INC., Seattle, WA (US)

( * ) Notice: Subject to any disclaimer, the term of this patent is extended or adjusted under 35 U.S.C. 154(b) by 1129 days.

(21) Appl. No.: 14/921,693

(22) Filed: Oct. 23, 2015

(65) Prior Publication Data

US 2016/0042319 A1 Feb. 11, 2016

Related U.S. Application Data

(63) Continuation-in-part of application No. 13/755,132, filed on Jan. 31, 2013, now abandoned.

(51) Int. Cl.
*G06Q 10/08* (2012.01)

(52) U.S. Cl.
CPC ..... *G06Q 10/0838* (2013.01); *G06Q 10/0833* (2013.01)

(58) Field of Classification Search
CPC ............. G06Q 10/083; G06Q 10/0838; G06Q 10/0833
See application file for complete search history.

(56) References Cited

U.S. PATENT DOCUMENTS

| | | | |
|---|---|---|---|
| 8,000,988 B1 | 8/2011 | Bezanson et al. | |
| 8,682,479 B1* | 3/2014 | Clupper | G06Q 10/063 700/224 |
| 9,037,287 B1 | 5/2015 | Grauberger et al. | |
| 2003/0055869 A1* | 3/2003 | Rosenbaum | B07C 1/00 709/201 |
| 2003/0172007 A1 | 9/2003 | Helmolt et al. | |
| 2004/0186811 A1* | 9/2004 | Gullo | G06Q 30/04 705/402 |
| 2006/0224398 A1 | 10/2006 | Lakshman et al. | |
| 2006/0235739 A1 | 10/2006 | Levis et al. | |
| 2007/0156423 A1 | 7/2007 | Foth et al. | |
| 2007/0192258 A1* | 8/2007 | Norris, Jr. | G06Q 10/04 705/406 |
| 2008/0059212 A1 | 3/2008 | Obrea et al. | |

(Continued)

OTHER PUBLICATIONS

Adam Swartz et al., A method for Determining Mail Dispositions for Optimal Postal savings, IP.com Prior Art Database Technical Disclosure, Mar. 31, 2015, pp. 1-2 (Year: 2015).*

(Continued)

*Primary Examiner* — Rupangini Singh
(74) *Attorney, Agent, or Firm* — Morris & Kamlay LLP

(57) ABSTRACT

Systems and techniques are provided for generating a drop plan for a mailing containing a plurality of mailpieces. Tracking data may be received for mailings sent by a plurality of mailers, and estimated delivery times determined based upon the tracking data. A mailer may specify a delivery goal for a mailing and, based upon the estimated delivery times and the delivery goal, a drop plan for the mailing may be generated, which specifies at least one drop location for at least a portion of the mailing. The mailer also may modify the drop plan, such as by specifying additional constraints, modified attributes of the drop plan, additional or updated goals for the mailing, or the like.

22 Claims, 6 Drawing Sheets

(56) References Cited

U.S. PATENT DOCUMENTS

| | | |
|---|---|---|
| 2008/0082205 A1 | 4/2008 | Park et al. |
| 2008/0201185 A1 | 8/2008 | Winkelman et al. |
| 2009/0063215 A1 | 3/2009 | Heise et al. |
| 2009/0076933 A1 | 3/2009 | Park et al. |
| 2009/0248470 A1* | 10/2009 | Pintsov ............ G07B 17/00024 705/401 |
| 2010/0312715 A1 | 12/2010 | Esque et al. |
| 2011/0161249 A1 | 6/2011 | Whitehouse |
| 2011/0173041 A1 | 7/2011 | Breitenbach et al. |
| 2012/0317056 A1* | 12/2012 | Leon ................ G07B 17/00733 705/404 |
| 2013/0060377 A1* | 3/2013 | Otey ................ G07B 17/00362 700/224 |
| 2013/0198060 A1 | 8/2013 | Whitehouse |
| 2014/0214716 A1 | 7/2014 | Mauch |

OTHER PUBLICATIONS

EESR of EP 14153225.9 dated Apr. 7, 2014.
International Search Report and Written Opinion dated Jan. 19, 2017 as received in Application No. PCT/US2016/058527.

\* cited by examiner

610 — Receive, from a customer, one or more desired delivery goals for an automation mailing of a first plurality of mailpieces for the customer

620 — Receive tracking data for automation mailings of a second plurality of mailpieces sent by a plurality of mailers

630 — Determine, based on the tracking data, estimated delivery times between locations

640 — Generate, based on the estimated delivery times and the one or more desired delivery goals, a drop plan for the automation mailing of the first plurality of mailpieces

650 — Transmit, to a specific mailer, the drop plan

SHIPMENT PLANNING

CROSS-REFERENCE TO RELATED APPLICATIONS

This application is a continuation-in-part of U.S. application Ser. No. 13/755,132, filed Jan. 31, 2013, the disclosure of which is incorporated by reference in its entirety.

BACKGROUND

When planning a mailing, a mailer may have one or more goals related to how the mailing should be submitted to the post office or otherwise arranged for mailing. For example, the mailer may wish to obtain the best postal discount possible or available, have the mail delivered to final recipients as quickly as possible, simplify mail preparation, achieve a target delivery timeframe, or the like. In some cases mailers can achieve such goals through use of products that offer suggestions directed to cost reduction, efficiency, delivery arrangement or the like. For example, discount estimation products may be used to determine the highest postage discount available for a particular mailing. Similarly, mailers may utilize different mailing options to insure that mailings are delivered as quickly as possible, though this often incurs additional cost.

As used herein, a "mailer" may refer to an entity such as a corporation that produces and sends mailings directly through a carrier such as the USPS and/or other shipment and delivery services, a mail service provider such as a print shop or targeted mail producer, a mail house that services multiple smaller mailing customers, or the like. More generally, a "mailer" may refer to any entity that produces mailings that include similar or identical mailpieces that are intended for a variety of destinations.

BRIEF SUMMARY

Embodiments of the present invention provide systems and techniques for generating a drop plan for a mailing containing a plurality of mailpieces. In an embodiment, tracking data may be received for mailings sent by a plurality of mailers. Estimated delivery times may be determined based upon the tracking data, for example by analyzing actual delivery times to identify patterns and forecast expected delivery times for similar or identical delivery routes. A request may be received from a mailer, which specifies a mailing and a delivery goal for the mailing. Based upon the estimated delivery times and the delivery goal, a drop plan for the mailing may be generated, which specifies at least one drop location for at least a portion of the mailing. The drop plan may then be provided to the requesting mailer, and implemented by the mailer and/or systems as disclosed herein. The mailer also may modify the drop plan, for example by providing an updated request. The updated request may specify additional constraints, modify attributes of the drop plan, provide additional or updated goals for the mailing, or the like. The drop plan may then be modified based upon the request, and the updated drop plan provided to the requesting mailer.

In an embodiment, the delivery goal specified by the mailer may include a target delivery date, target delivery time, desired postal discount or discount threshold, and/or other goals for the mailing. The drop plan may specify, for example, at least one drop location which will cause at least a portion of the mailing to be delivered within a threshold number of days of a target delivery date, and/or within a threshold number of delivery days, or the like. The threshold may be as short as possible, for example, within not more than three days of a target delivery date. The drop plan may specify other aspects of the mailing, such as a drop time and/or location for each portion of the mailing.

In an embodiment, the tracking data used to generate expected delivery times may include tracking data based upon the requesting mailer's previous mailings. Alternatively or in addition, it also may include tracking data not available to the first mailer, such as tracking data associated with prior mailings provided by other mailers. The requesting mailer may be one of several mailers, the prior mailings of which are used to collect tracking data used to generate expected delivery times and drop plans as disclosed herein.

Additional features, advantages, and implementations of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementation of the disclosed subject matter. No attempt is made to show structural details in more detail than may be necessary for a fundamental understanding of the disclosed subject matter and the various ways in which it can be practiced.

FIG. 6 shows an example process for automation mailing of mailpieces according to an embodiment disclosed herein.

DETAILED DESCRIPTION

Figure 1A:
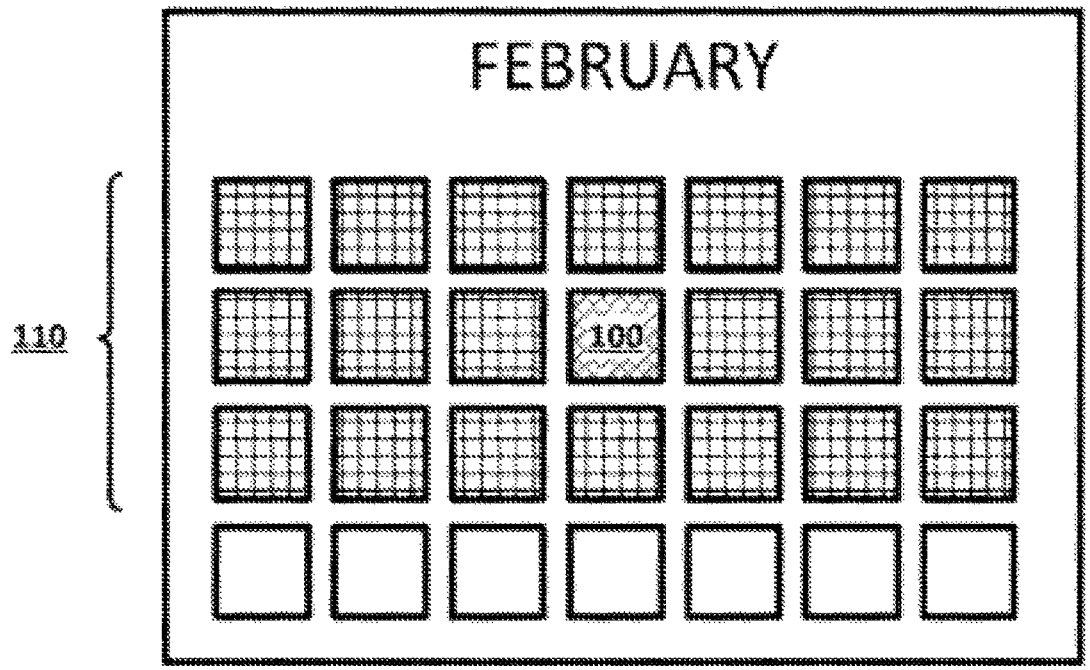
FIG. 1A shows an example projected delivery calendar for a mailing delivered through a conventional postal system.

Current mailing systems typically allow for delivery estimates, but it is well known that actual delivery times to specific locations often vary greatly from such estimates. There currently is no system, arrangement, or other product that will allow mailers to see current mail flows with enough intelligence or detail to plan a mailing for a target delivery date or within a limited date range. Such information may be useful in a variety of scenarios. For example, it has been found that recipients of invoices or bills tend to submit payments earlier and more regularly when mail is delivered toward the end of a week. As another example, when sending promotional mail items that include a limited time offer, such as coupons, notifications of weekend or other limited time sales, or the like, the promotion is likely to be more effective if delivered prior to that relevant time, but not substantially in advance of the time. Late delivery of the promotional mail may cause last-minute extensions of offers, and may give a poor impression to the mail recipient. As another example, it may be desirable to deliver mail that formerly would have included a "Postmaster please deliver by" indicator within a certain timeframe, because the USPS has announced that they will no longer use the "In-home date" requests on some mail items, specifically for automation mail. This may give mailers of automation mail a disadvantage, even though they prepare their mail for better handling for USPS. For these and other uses, it has been found that a tool that allows a user (such as a mailer, for example) to plan their drop shipments, including locations, drop ship methods, and drop dates, may be useful to allow users to plan for all of the goals they have for the delivery of their mail.

Embodiments of the present invention provide systems and techniques for allowing a user to select the goal they have for delivery of their mail, and automatically calculate specific drops, drop ship methods, and mail drop dates that will help them achieve that goal. The user also may make adjustments to the suggested drop plan and see how those changes would affect their goal.

Mailers may define various goals for a particular mailing. As an example, a mailer may wish to obtain a best available postal or other shipping discount. Postal systems and shipping providers typically provide a discount if the mail is prepared (such as pre-sorted by delivery zip code, for example) and "dropped" (provided to a processing center of the postal or shipping provider), such as at a sectional center facility (SCF) and/or network distribution center (NDC), for example. However, the cost of transporting the mail to those processing centers may be more than the discount that is provided. Hence, in an embodiment, the customer may be provided a summary of these options, and may select which method(s) they would like to use, get or enter shipping estimates, and compare the results to the projected postage discounts. Example shipping methods include the use of logistics providers, which often provide a set cost to deliver mail from one location to the next; postal system arrangements that provide set or variable costs for receiving mail in specific volume and/or containers, such as the USPS priority mail open and distribute (PMOD) system; and self-ship techniques, such as where a mailer has its own fleet of delivery or transport vehicles, the cost of which includes fuel and maintenance of the fleet.

Another example of a mailing goal is to obtain a fastest delivery time. For example, when a mailer desires mail to be delivered as quickly as possible, the mailer may not mind that the shipping cost for selected drop points outweighs the available postage discounts. In this case, the mailer may want to enter the mail far into the mail stream, regardless of the cost, to obtain a more rapid delivery.

Another example of a mailing goal is to have mailpieces delivered within a desired target date range. Postal systems typically publish expected delivery times, such as the service standards published by the USPS, but it has been found that such times may not be accurate. For example, weather, facility outages, acts of God, and other events may cause actual mail delivery times to vary from the published expected delivery times. In an embodiment disclosed herein, historical tracking data may be assembled from multiple postal customers and aggregated based upon drop locations within a given region. This historical data may then be used to project expected delivery times based upon mail drop location and destination. A mailer may then select a target delivery date and/or target drop date, and a drop plan may be created based upon the mailer's desired dates and the projected expected delivery times derived from the historical tracking data. Notably, as disclosed herein, the tracking data may be assembled based upon historical delivery times for multiple mailers, thus providing a more complete and accurate estimate than would otherwise be available to a single mailer who only had access to their own historical delivery data.

Figure 1B:
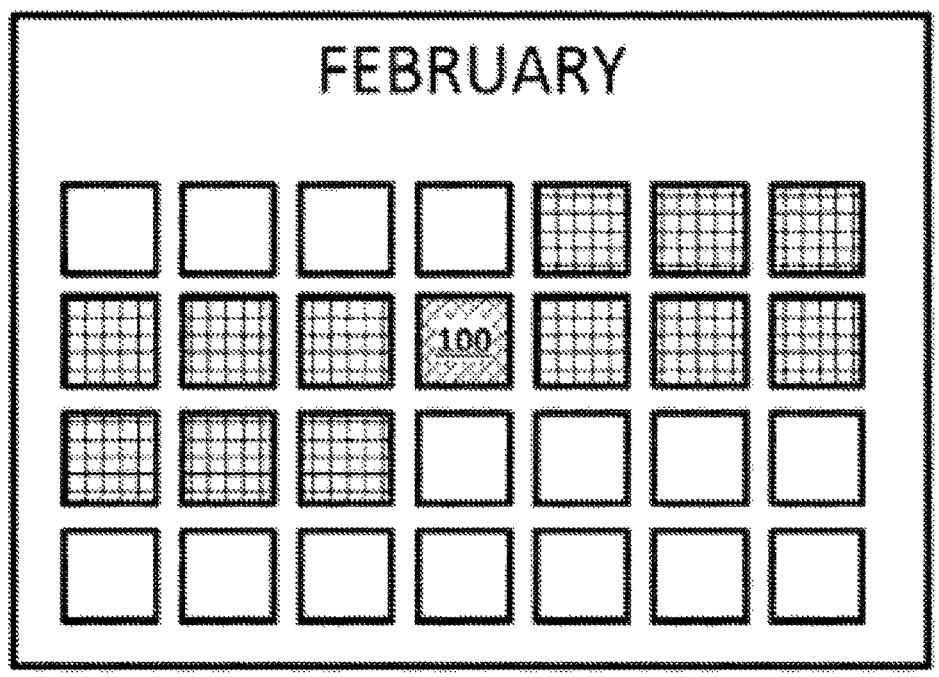
FIG. 1B shows an example projected delivery calendar with a reduced expected delivery window.

FIG. 1A shows an example projected delivery calendar for a mailing delivered to a variety of geographically diverse destinations through a conventional postal system, such as the USPS Standard Mail. As shown, when the mailing is dropped at a single location, actual delivery at the locations of the various destinations may be expected to occur within a three week window 110 around a desired delivery date 100. This variance may be limited somewhat, such as by use of logistics companies to deliver portions of a mailing to different drop points. FIG. 1B shows an example projected delivery calendar in which the expected delivery window around the desired delivery date 100 is reduced to two weeks, for example by such use of a conventional logistic company to deliver portions of the mailing to different drop points. However, delivery times at the locations of the various destinations still may be sporadic, and may be subject to USPS and/or logistics company delays.

Figure 1C:
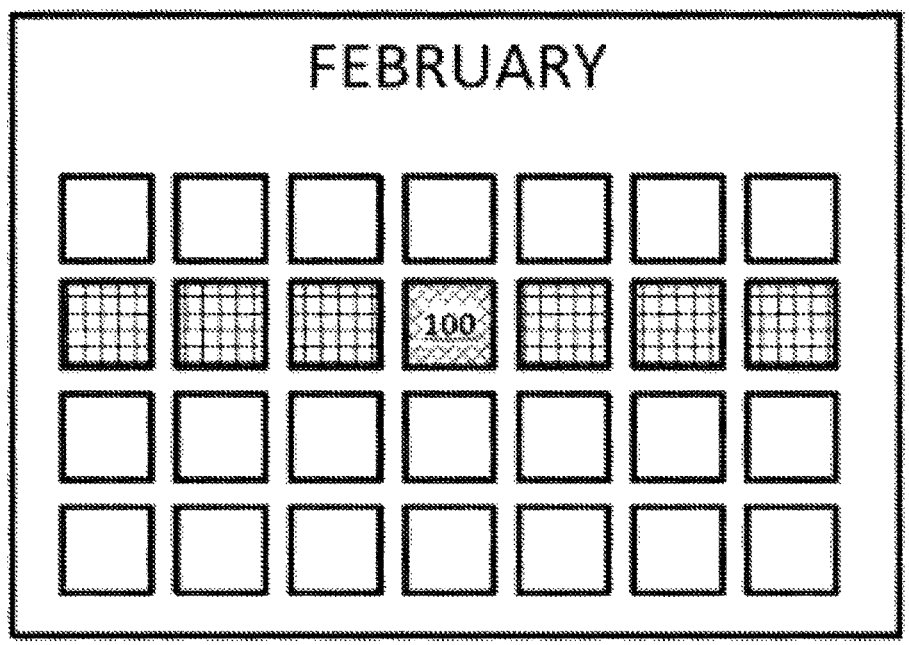
FIG. 1C shows a projected delivery calendar for a mailing according to an embodiment disclosed herein.

FIG. 1C shows a projected delivery calendar for the same mailing according to an embodiment disclosed herein. The delivery calendar may be generated based upon the desired delivery date 100 received from a mailer. Historical projections for mail delivery from one or more drop locations may be used to create a drop plan for the mailing, which will cause the mailpieces to be delivered to the locations of the various destinations within the time period shown. For example, as disclosed herein, Intelligent Mail Barcode (IMB) and/or other tracking data may be aggregated and used to project the expected delivery time(s) for one or more drop locations to the appropriate destination(s), which will result in delivery close to the desired date.

Figure 2:
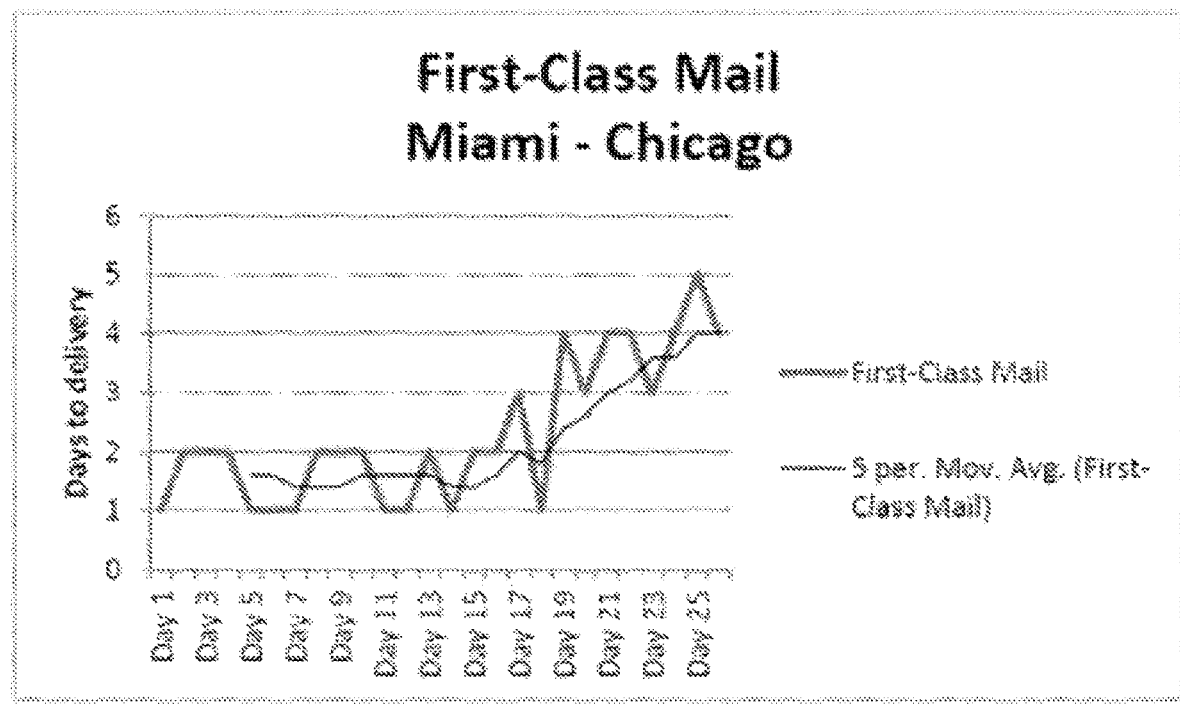
FIG. 2 shows an example of historical tracking data that may be collected according to an embodiment disclosed herein.

For example, FIG. 2 shows an example of data that may be generated according to an embodiment disclosed herein. The data may include or be based upon tracking data obtained from a postal system, such as IMB tracking data for multiple mailpieces processed by the USPS. In the example shown, the tracking data is used to determine delivery times based upon the date (such as day of a given month, for example) for mailpieces sent from Miami to Chicago. Such data may be used to develop an estimated delivery time for similar mailpieces, for example by calculating an average or moving average as shown for mailpieces that will be transported on equivalent routes. For example, based on the data shown, it may be estimated that a mailpiece destined for Chicago from Miami, mailed on the 13th day, will take no more than 2 days to be delivered. It will be appreciated that actual delivery times may change, due to weather, route changes, and other factors. Therefore, with continued reference to FIG. 2, a mailpiece mailed on the 24th day may be estimated to take 4 days to be delivered. Similarly, according to an embodiment, a drop plan may be designed that incorporates the expected delivery time for mail traveling from Miami to Chicago, and advise a mailer to deposit mail at a Miami drop location at the appropriate time to obtain a corresponding desired delivery time.

Figure 3:
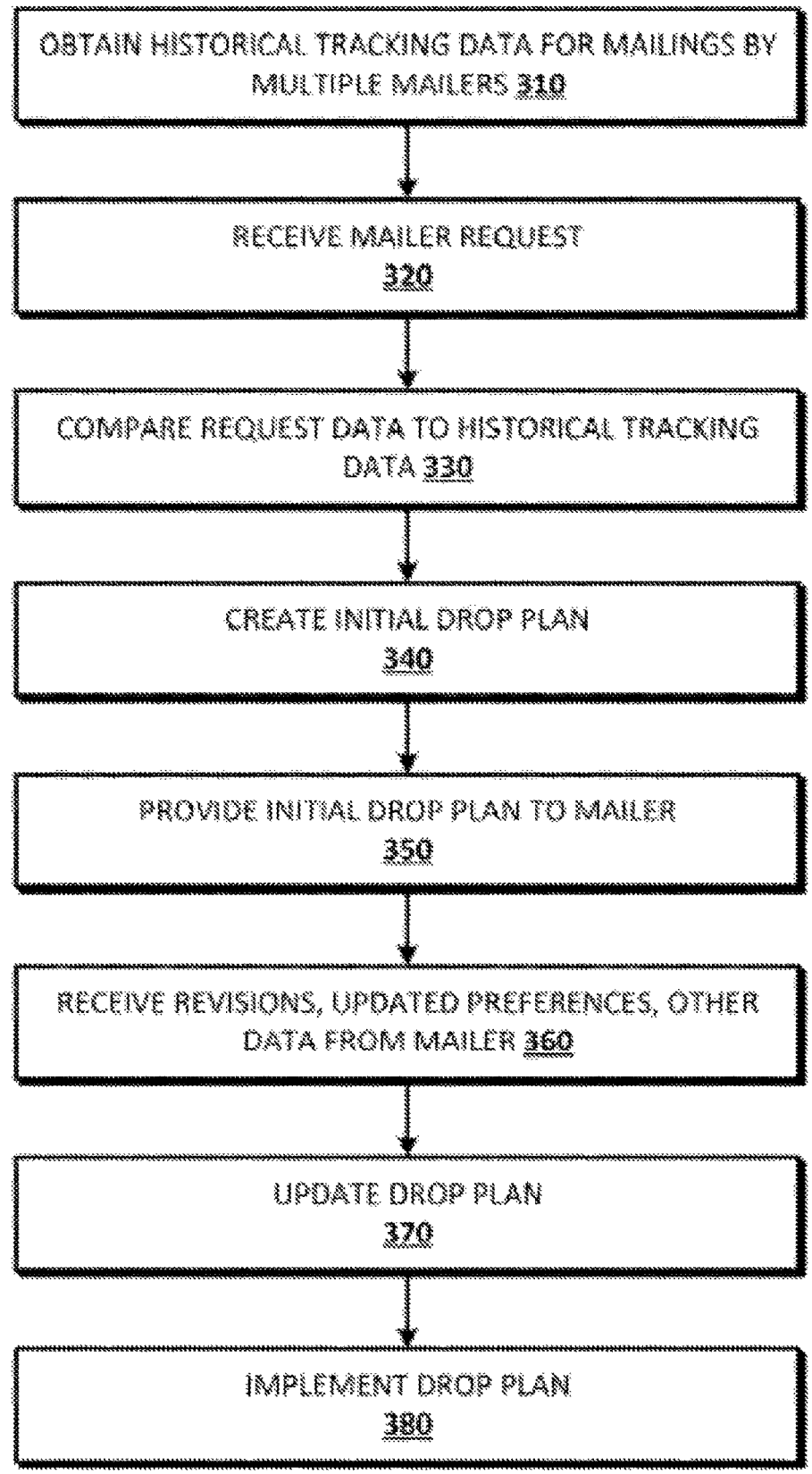
FIG. 3 shows an example process for collecting and using tracking data according to an embodiment disclosed herein.

FIG. 3 shows an example process for collecting and using tracking data according to an embodiment disclosed herein. A delivery forecast system such as a mail tracking service provider may obtain historical tracking data for a plurality of mailpieces that have been processed through a mailing system such as a postal service at 310. The historical tracking data may be obtained from historical records, i.e., for mailings that took place in the past and for which stored tracking data is available, or tracking data may be obtained as mailpieces are transported through the mailstream. The tracking data may be aggregated and analyzed as it is collected, and/or it may be stored for later analysis, such as in response to a mailer query.

At 320, a request may be received from a mailer. The request may indicate, for example, a mailing and a target delivery date. The request also may indicate a desired goal for the mailing, such as minimal cost, maximum discount, fastest delivery, or the like. Information about the mailing provided with or subsequent to the request may include, for example, a list of destination addresses, the size, weight, or other information about the mailpieces in the mailing. The delivery forecast system may then retrieve relevant information about expected delivery times at the locations of the various destinations for the mailpieces in the mailing, based upon a date the mailpieces are provided to one or more projected, expected, or potential drop locations. For example, the mailer may indicate one or more preferred drop locations to be used for the mailing. Alternatively or in addition, the delivery forecast system may identify one or more drop locations that can be used for the mailing. One of skill in the art understands that obtaining the historical tracking data for the plurality of mailpieces that have been processed through the mailing system at 310 and receiving the request, from the mailer, indicating the mailing and the target delivery date at 320 can be performed in either order.

At 330, by comparing the requested and/or suggested drop locations, historical tracking data between the drop location or locations and the locations of the various destinations, and the target delivery data, the delivery forecast system may create a drop plan at 340 that indicates which mailpieces should be dropped at one or more drop locations, and/or when portions of the mailing should be dropped at the drop locations, to achieve the stated goal. For example, the drop plan may indicate that the majority of mailpieces in the mailing should be dropped at a first location on a first date, but that all mailpieces ultimately bound for New England should be dropped at a different second location on a date that may or may not differ from the first date, because delivery times from the first location would result in mailpieces arriving substantially after a desired delivery date. As another example, the drop plan may indicate several locations and the mailpieces that should be dropped at each, to obtain the maximum postage discount for each mailpiece without regard to the expected delivery time for each mailpiece. Alternatively, the drop plan may indicate one or more drop locations and/or drop dates at which one or more mailpieces should be dropped to obtain the maximum available postage discount while still having an expected delivery date within a desired range of a target delivery date.

At 350 the drop plan may be provided to the mailer. The drop plan may include multiple options for drop locations, drop dates, expected delivery dates or date ranges, and delivery or transport mechanisms. In an embodiment, the mailer may be provided with various options to change features of the drop plan, such as by adding or removing drop locations, adjusting the number of specific mailpieces that will be delivered to each drop location, the date that mailpieces should be dropped at specific drop locations, or the like. The mailer also may provide updated goals or preferences, such as by adjusting the target delivery date for all or some of the mailing. Such additional information may be received at 360 and, if appropriate, an updated drop plan may be provided to the mailer at 370. Thus, the mailer may be able to see the effect of changing features of the drop plan immediately.

Once the drop plan is finalized, it may be provided to the mailer and/or implemented by the forecast system or related systems at 380. For example, where the forecast system is part of a larger mail tracking system, the larger system may provide further services to the user to implement the drop plan. As a specific example, the mail tracking system may generate and provide IMB tracking identifiers for the mailpieces in the mailing, or may otherwise enable the mailer to implement the drop plan.

Notably, a drop plan as disclosed herein may be based upon, and/or refined by, historical tracking data obtained from mailpieces sent by multiple mailers, which may or may not include the mailer that requests the drop plan. Thus, the drop plan may be more accurate, detailed, or otherwise more robust than a single mailer would be able to produce based solely on that mailer's own historical tracking data. For example, a mailer may commonly send time-sensitive mail to the eastern portion of the U.S. and, therefore, may be able to generate relatively accurate forecasts of expected delivery dates based only on the mailer's own historical tracking data. However, if the mailer wishes to send a mailing that will be delivered to destinations outside the eastern U.S., or that includes destinations both within and outside prior delivery areas, the mailer's own historical tracking data may be insufficient to provide an accurate forecast of expected delivery dates. Further, delays within the postal service or other delivery services may be unknown or unexpected based upon the mailer's historical tracking data, but may be readily apparent when aggregate tracking data from multiple mailers is considered by a delivery forecast system as disclosed herein.

As previously described, embodiments disclosed herein may allow a mailer to more accurately forecast and plan delivery dates for a mailing. For example, the table below shows expected delivery times for a mailing arranged using a conventional postal system, such as where the mailer relies only on USPS expected delivery times and provides the mailing to several drop points on the same day.

TABLE 1

| Mailing Portion | Drop Point | Destination | Drop Date | Delivery Time | Delivery |
| --- | --- | --- | --- | --- | --- |
| 1 | NDC/SCF A | V | Jun. 17, 2013 | 5 days | Jun. 22, 2013 |
| 2 | NDC/SCF B | W | Jun. 17, 2013 | 12 days | Jun. 29, 2013 |
| 3 | NDC/SCF C | X | Jun. 17, 2013 | 3 days | Jun. 20, 2103 |
| 4 | NDC/SCF D | Y | Jun. 17, 2013 | 16 days | Jul. 3, 2013 |
| 5 | NDC/SCF E | Z | Jun. 17, 2013 | 9 days | Jun. 26, 2013 |

Notably, the mailpieces in the mailing are delivered over a relatively large time window, between June 22 and July 3. According to an embodiment, a mail forecast system may provide more accurate expected delivery times and/or a complete drop plan to the mailer. For example, a drop plan may indicate that the mailings should be delivered to the drop points at different times, to achieve greater uniformity in delivery dates, as shown in the example below:

TABLE 2

| Mailing Portion | Drop Point | Destination | Drop Date | Delivery Time | Delivery |
|---|---|---|---|---|---|
| 1 | NDC/SCF A | V | Jun. 20, 2013 | 5 days | Jun. 25, 2013 |
| 2 | NDC/SCF B | W | Jun. 15, 2013 | 12 days | Jun. 27, 2013 |
| 3 | NDC/SCF C | X | Jun. 20, 2013 | 3 days | Jun. 23, 2103 |
| 4 | NDC/SCF D | Y | Jun. 12, 2013 | 16 days | Jun. 28, 2013 |
| 5 | NDC/SCF E | Z | Jun. 17, 2013 | 9 days | Jun. 26, 2013 |

In this example, the drop plan may not set drop dates to achieve identical delivery dates. For example, the mailer may indicate that the mailing will not be ready to be mailed prior to June 12, thus restricting the drop plan to drop dates no earlier than June 12.

As another example, the drop plan may suggest that portions of the mailing should be delivered to different drop points than initially planned by the mailer. For example, it may be determined that, based on historical tracking data, Mailing Portion 2 will arrive at its destination more quickly than expected based upon USPS projected delivery dates if it is delivered to NDC A, allowing for the following drop plan and delivery dates:

TABLE 3

| Mailing Portion | Drop Point | Destination | Drop Date | Delivery Time | Delivery |
|---|---|---|---|---|---|
| 1 | NDC/SCF A | V | Jun. 20, 2013 | 5 days | Jun. 25, 2013 |
| 2 | NDC/SCF A | W | Jun. 17, 2013 | 9 days | Jun. 26, 2013 |
| 3 | NDC/SCF C | X | Jun. 20, 2013 | 3 days | Jun. 23, 2103 |
| 4 | NDC/SCF D | Y | Jun. 12, 2013 | 16 days | Jun. 28, 2013 |
| 5 | NDC/SCF E | Z | Jun. 17, 2013 | 9 days | Jun. 26, 2013 |

In this example, the mailer may not need to provide Mailing Portion 2 to a drop point as early as in the prior example, while still achieving delivery within a smaller time window.

As another example, the mailer may request a drop plan that will achieve the best discount available and/or the lowest total cost for the mailing, but may have less stringent requirements for delivery times. It may be determined, based on discount information and historical tracking data, that the mailing will receive the same discount if all mailpieces are dropped at SCF A or B, but that the delivery dates will be more uniform if Mailing Portions 1, 2, and 5 are dropped at SCF A, and Mailing Portions 3 and 4 are dropped at SCF B, resulting in the following:

TABLE 4

| Mailing Portion | Drop Point | Destination | Drop Date | Delivery Time | Delivery |
|---|---|---|---|---|---|
| 1 | NDC/SCF A | V | Jun. 20, 2013 | 5 days | Jun. 25, 2013 |
| 2 | NDC/SCF A | W | Jun. 17, 2013 | 9 days | Jun. 26, 2013 |
| 3 | NDC/SCF B | X | Jun. 17, 2013 | 10 days | Jun. 27, 2103 |
| 4 | NDC/SCF B | Y | Jun. 12, 2013 | 18 days | Jun. 30, 2013 |
| 5 | NDC/SCF A | Z | Jun. 17, 2013 | 12 days | Jun. 29, 2013 |

More generally, a delivery forecast system as disclosed herein may provide for a preferred or optimized drop plan based upon a mailer's preference for discount or cost, delivery time, and/or delivery time. The specific examples provided are illustrative only, and it will be understood that various other preferences and combinations may be provided in a drop plan as disclosed herein.

Figure 4:
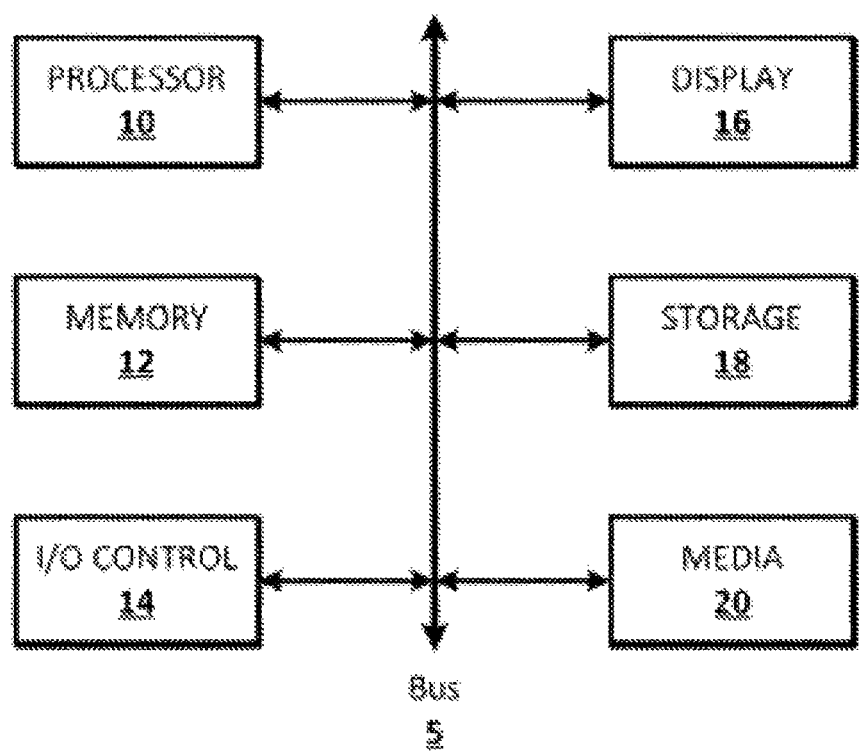
FIG. 4 shows a computer suitable for implementing an embodiment of the present invention.

Implementations of the presently disclosed subject matter may be implemented in and used with a variety of component and network architectures. FIG. 4 is an example computer device suitable for implementing implementations of the presently disclosed subject matter. The device may be, for example, a desktop computer, a laptop or palmtop computer, a portable computing device such as a tablet, smartphone, mobile computer, or the like, a server, or, more generally, any computing device that can implement the features disclosed herein. In some implementations, various specific hardware devices may be used or preferred, as described elsewhere herein.

The computer may include a bus 5 which interconnects major components of the computer. Such components may include a central processor 10, which may be a general- or special-purpose processor. When configured to implement the features disclosed and claimed herein, the central processor may become, and/or operate as, a special-purpose processor that implements those features. The computer 20 may include one or more memory modules 12 (typically RAM, but which may also include ROM, flash RAM, or the like), to store instructions, data, and the like. An input/output controller 14 or similar module, may provide an interface to and/or control of various user input devices, such as a mouse, keyboard, touchscreen, and the like. The user display 16 may provide a visual user interface and/or user input mechanism, such as via a display screen and/or a touchscreen. Fixed storage 18, such as a hard drive, flash storage, or similar storage mechanism, may provide long-term storage for data, executable instructions such as application programs, and the like. A removable media component 20 may control and receive a removable storage device, such as an optical disk, flash drive, SD card, USB drive, and the like. The computer may include various other components and interfaces, such as interfaces to allow other devices to connect to the computer, including USB, audio inputs and/or outputs, IEEE 1394, proprietary connectors, and the like.

The bus 5 may provide or allow data communication between the central processor 10 and the memory 12, which may include ROM, flash memory, and/or RAM, as previously noted. The RAM is generally the main memory into which the operating system and application programs are loaded. The ROM and/or flash memory can contain, among other code, the Basic Input-Output system (BIOS) which controls basic hardware operation such as the interaction with peripheral components. Applications resident with the computer device typically may be stored on and accessed via a computer readable medium provided via the fixed storage 18 and/or removable media 20, such as a hard disk drive, an optical drive, or any other suitable storage medium.

The illustrated components may be integral with the computer or may be separate and accessed through other interfaces. For example, a computer-readable storage 18, memory 12, processor 10, and/or various other components may be provided by a cloud service or other remote service. Similarly, a portion of the functionality provided by one or more components may be provided by a remote service, such as a cloud service. As a specific example, a device as disclosed herein may include local storage 18 and may also interface with a cloud service that provides additional storage, the integration of which with the local storage 18 may be undetectable by a user. A network interface 22 may provide a direct connection to a remote server, cloud service, or the like. The network interface 29 may connect to one or more other computing devices and/or networks using wireless techniques and connections such as a digital cellular telephone, an IEEE 802.11x or other wireless network, a Bluetooth interface, or the like. For example, the network interface 22 may allow the computer to communicate with other computers via one or more local, wide-area, or other networks.

Many other devices or components may be connected in a similar manner, including peripherals and other devices such as document scanners, digital cameras, printers, external displays, external user input devices, and the like. Conversely, all of the components shown in FIG. 4 need not be present to practice or implement aspects of the disclosed subject matter. The illustrated components and other components can be interconnected in different ways from that shown. The general operation of computing devices such as the example device illustrated in FIG. 4 is readily known in the art and is not discussed in detail in this application. Executable instructions to implement the present disclosure may be stored in various computer-readable storage media such as one or more of the memory 12, fixed storage 18, removable media 20, on a remote storage device, or any combination thereof.

More generally, various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

Embodiments disclosed herein also provide improvements to the technical field of automation mail. Automation mail involves using computer-readable indicia disposed on mailpieces that can be scanned to produce tracking data. For example, the computer-readable indicia can be a barcode, a Quick Response (QR) code, a radio-frequency identification tag, the like, or any combination thereof.

Figure 5:
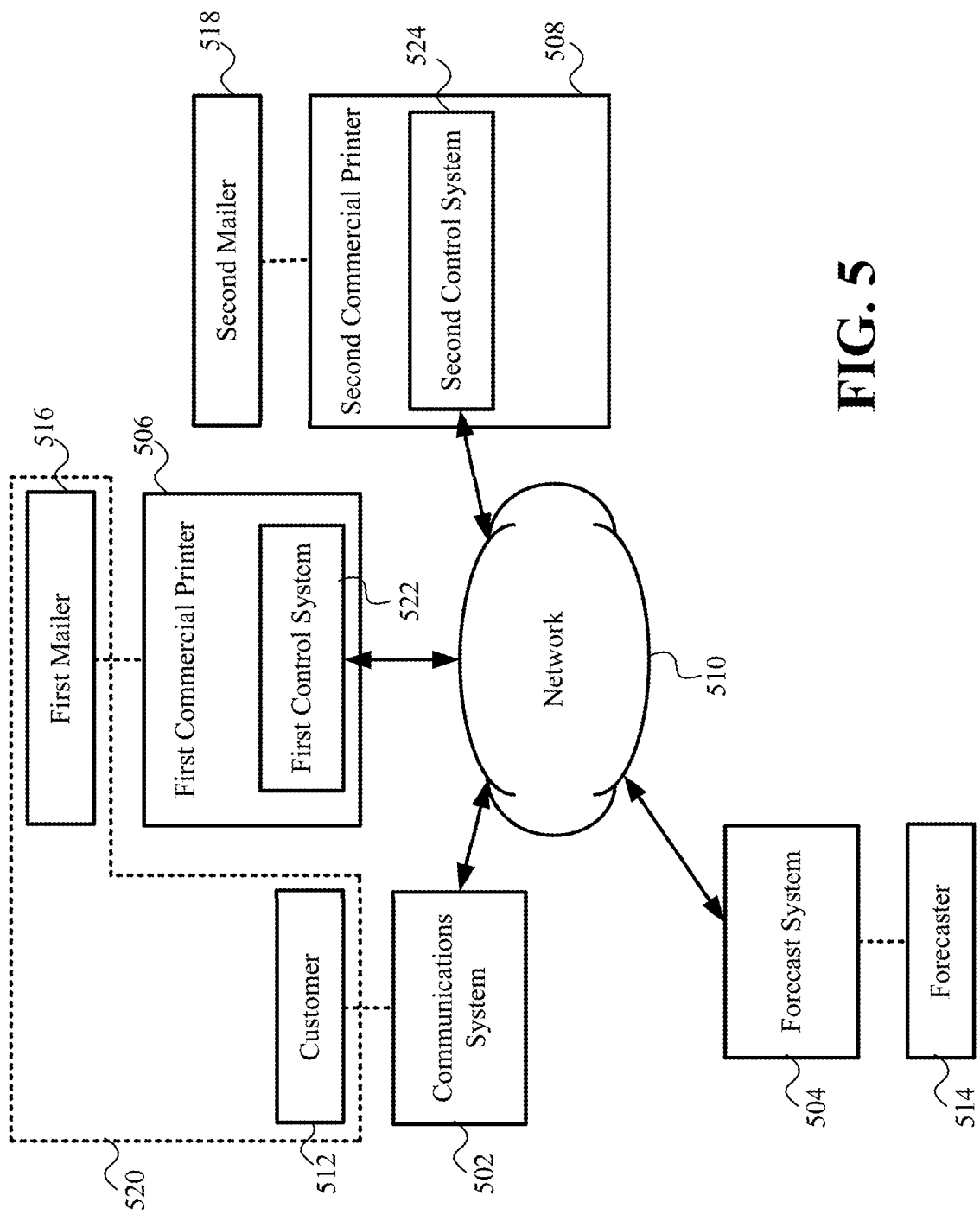
FIG. 5 shows an example environment for automation mailing of mailpieces according to embodiments disclosed herein.

FIG. 5 shows an example environment 500 for automation mailing of mailpieces according to embodiments disclosed herein. The environment 500 can include several elements such as, for example, a communications system 502, a forecast system 504, a first commercial printer 506, and a second commercial printer 508. In an implementation, an element of the environment 500 can be communicatively connected to one or more other elements via a network 510. The communications system 502 can be used, for example, by a customer 512. The forecast system 504 can be used, for example, by a forecaster 514 such as Neopost S. A. of Bagneux, France. The first commercial printer 506 can be used, for example, by a first mailer 516. The second commercial printer 508 can be used, for example, by a second mailer 518. The customer 512 and the first mailer 516 can be, for example, a common entity 520. The first commercial printer 506 can include a first control system 522. The second commercial printer 508 can include a second control system 524. The first commercial printer 506 and/or the second commercial printer 508 can be, for example, a flexographic printer, an off-set printer, or an inkjet, a toner-based, or a photo-optic printer.

When automation mail is conducted in a conventional manner, for example, the customer 512 places an order with the first mailer 516 for a plurality of mailpieces to be printed by the first commercial printer 506 for automation mail and mailed at one or more drop points. As described above with reference to Table 1, all portions of the mailing are dropped at their respective drop points on a same drop date. Because of this approach, the first commercial printer 506 is used to print the plurality of mailpieces over a relatively short duration of time. This can place a relatively intense load on the first commercial printer 506, which can cause excessive wear of parts of the first commercial printer 506. Additionally, printing all portions of the mailing over the relatively short duration of time can require a need to sort and to store the mailpieces. Thus, conducting automation mail in a conventional manner can require the use of a mail sorter and/or a need for a relatively large storage area. Excessive wear of parts of the first commercial printer 506, possession and maintenance of a mail sorter, and/or the need for a relatively large storage area can cause the costs of conducting automation mail in a conventional manner to be relatively high.

In conducting automation mail according to embodiments disclosed herein, the customer 512, via the communications system 502 and the network 510, can send one or more desired delivery goals for an automation mailing of a first plurality of mailpieces to the forecaster 514. The forecaster 514, via the network 510, can receive the one or more desired delivery goals at the forecast system 504. The one or more desired delivery goals can include a desired delivery date, a desired cost, a desired discount, or a desired delivery speed of the automation mailing of the first plurality of mailpieces, the like, or any combination thereof.

The forecast system 504 can also receive tracking data for automation mailings of a second plurality of mailpieces sent by a first plurality of mailers. As described above, the tracking data can be obtained from automatically-scanned computer-readable indicia disposed on each of the second plurality of mailpieces. The forecast system 504 can determine, based on the tracking data, estimated delivery times between locations. In an implementation, the first plurality of mailers can include mailers other than the customer 512 and the first mailer 516. For this and other reasons, tracking data for automation mailings of the second plurality of mailpieces sent by the mailers other than the customer 512 and the first mailer 516 can be inaccessible by the customer 512 and the first mailer 516. For this and other reasons, a forecast produced using this tracking data advantageously can be better than a forecast produced using only tracking data accessible to the customer 512 and/or the first mailer 516. In an implementation, the tracking data can include tracking data for a first portion of the automation mailings of the second plurality of mailpieces that have arrived at destinations and/or tracking data for a second portion of the automation mailings of the second plurality of mailpieces that are en route to the destinations.

The forecast system 504 can generate, based on the estimated delivery times and the one or more desired delivery goals, a drop plan for the automation mail of the first plurality of mailpieces. The drop plan can include, for each portion of mailpieces of the first plurality of mailpieces, a drop date. As described above with reference to Table 2, for example, dropping each portion of mailpieces of the first plurality of mailpieces at its respective drop point on the drop date included in the drop plan can result in greater uniformity in delivery dates.

In an implementation, the drop plan can also include, for each portion of mailpieces of the first plurality of mailpieces, a drop location. As described above with reference to Table 3, for example, based on the estimated delivery times between locations, changing the drop location from a conventional drop location (e.g., a drop location nearest to a destination) can result in greater uniformity in delivery dates.

The forecast system 504 can transmit, to the first mailer 516 via the network 510, the drop plan. The drop plan can have a form configured to be received by the first control system 522 of the first commercial printer 506. The drop plan can have a form configured to be used by the first control system 522 to control operation of the first commercial printer 506 to print the first plurality of mailpieces. For example, the form of the drop plan can be in accordance with the Mail.dat® specification developed, validated, and published by the International Digital Enterprise Alliance (Idealliance) of Alexandria, Va.

For example, with reference to Table 2 above, the first control system 522 can use the drop plan to control the operation of the first commercial printer 506 to print: (1) mailing portion 4 of the first plurality of mailpieces on or nearly before Jun. 12, 2013, (2) mailing portion 2 of the first plurality of mailpieces on or nearly before Jun. 15, 2013, (3) mailing portion 5 of the first plurality of mailpieces on or nearly before Jun. 17, 2013, and (4) mailing portions 1 and 3 of the first plurality of mailpieces on or nearly before Jun. 20, 2013. As compared with automation mail conducted in a conventional manner, described above with reference to Table 1, the printing of the mailpieces for the mailing described with reference to Table 2 occurs over a relatively long duration of time. Spreading the load on the first commercial printer 506 over a relatively long duration of time can prevent parts of the first commercial printer 506 from being subjected to excessive wear. Additionally, printing portions of the mailing at different times can preclude a need to sort the mailpieces such that the first mailer 516 may not need to incur the expense of possessing and maintaining a mail sorter. Printing portions of the mailing at different times can also reduce a need for a relatively large storage area. Preventing parts of the first commercial printer 506 from being subjected to excessive wear, precluding a need to possess and maintain a mail sorter, and/or reducing an amount of storage area needed by the first mailer 506 can cause the costs of conducting automation mail according to embodiments disclosed herein to be less than the costs of conducting automation mail in a conventional manner.

Additionally or alternatively, with reference to Table 2 above, for example, the forecast system 504, with approval of the customer 512, can transmit portions of the drop plan to different mailers. For example, the forecast system 504 can transmit via the network 510: (1) a portion of the drop plan associated with mailing portion 1 to the first mailer 516 located near to the drop point NDC/SCF A, (2) a portion of the drop plan associated with mailing portion 2 to the second mailer 518 located near to the drop point NDC/SCF B, (3) a portion of the drop plan associated with mailing portion 3 to a third mailer (not illustrated) located near to the drop point NDC/SCF C (4) a portion of the drop plan associated with mailing portion 4 to a fourth mailer (not illustrated) located near to the drop point NDC/SCF D, and (5) a portion of the drop plan associated with mailing portion 5 to a fifth mailer (not illustrated) located near to the drop point NDC/SCF E.

FIG. 6 shows an example process 600 for automation mailing of mailpieces according to an embodiment disclosed herein. In the process 600, at 610, one or more desired delivery goals for an automation mailing of a first plurality of mailpieces for a customer can be received from the customer. The one or more desired delivery goals can include a desired delivery date, a desired cost, a desired discount, a desired delivery speed of the automation mailing of the first plurality of mailpieces, the like, or any combination thereof.

At 620, tracking data for automation mailings of a second plurality of mailpieces sent by a first plurality of mailers can be received. The tracking data can be obtained from automatically-scanned computer-readable indicia disposed on each of the second plurality of mailpieces. The computer-readable indicia can be, for example, a barcode, a Quick Response (QR) code, a radio-frequency identification tag, the like, or any combination thereof. The tracking data can include, for example, tracking data for a first portion of the automation mailings of the second plurality of mailpieces that have arrived at destinations and/or tracking data for a second portion of the automation mailings of the second plurality of mailpieces that are en route to the destinations.

At 630, estimated delivery times between locations can be determined based on the tracking data. At 640, a drop plan for the automation mailing of the first plurality of mailpieces can be generated based on the estimated delivery times and the one or more desired delivery goals. The drop plan can include, for each portion of mailpieces of the first plurality of mailpieces, a drop date. Additionally, for example, the drop plan can include, for each portion of mailpieces of the first plurality of mailpieces, a drop location.

At 650, the drop plan can be transmitted to a specific mailer. The drop plan can have a form configured to be received by a control system of a commercial printer of the specific mailer and to be used by the control system to control operation of the commercial printer to print the first plurality of mailpieces. In an implementation, the customer can be the specific mailer. The commercial printer can be, for example, a flexographic printer, an off-set printer, or an inkjet, a toner-based, or a photo-optic printer. The form of the drop plan can be, for example, in accordance with the Mail.dat® specification developed, validated, and published by the International Digital Enterprise Alliance (Idealliance) of Alexandria, Va. In an implementation, the specific mailer can be a second plurality of mailers. Each mailer of the second plurality of mailers can be associated with one or more portions of mailpieces of the first plurality of mailpieces.

In an embodiment, the first plurality of mailers can include mailers other than the customer and the specific mailer. Tracking data for automation mailings of the second plurality of mailpieces sent by the mailers other than the customer and the specific mailer can be inaccessible by the customer and the specific mailer.

In an embodiment, the drop plan can be configured to be used by the control system of the commercial printer to control operation of the commercial printer to print the first plurality of mailpieces in a manner that precludes a need to sort mailpieces of the first plurality of mailpieces.

In an embodiment, the drop plan can be configured to be used by the control system of the commercial printer to control operation of the commercial printer to print the first plurality of mailpieces during a first duration of time. The first duration of time can be longer than a second duration of time. The second duration of time can be a duration of time of operation of the commercial printer to print the first plurality of mailpieces in an absence of the drop plan.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
   receiving, at a forecast system, via a network, and from a communications system of a customer, at least one desired delivery goal for an automation mailing of a first plurality of mailpieces for the customer;
   receiving, at the forecast system, tracking data for automation mailings of a second plurality of mailpieces sent by a first plurality of mailers, the tracking data obtained from automatically-scanned computer-readable indicia disposed on each of the second plurality of mailpieces;
   determining, by the forecast system and based on the tracking data, estimated delivery times between locations;
   generating, by the forecast system and based on the estimated delivery times and the at least one desired delivery goal, a drop plan for the automation mailing of the first plurality of mailpieces, the drop plan including, for each portion of the mailpieces of the first plurality of mailpieces, a drop date; and
   transmitting, from the forecast system, via the network, and to a commercial printer associated with a specific mailer, the drop plan, the drop plan having a form configured to be received by a control system of the commercial printer and to be used by the control system to control operation of the commercial printer to print the first plurality of mailpieces in a first duration of time, the first duration of time being longer than a second duration of time, the second duration of time being a duration of time of operation of the commercial printer to print the first plurality of mailpieces in an absence of the drop plan.

2. The method of claim 1, wherein the customer is the specific mailer.

3. The method of claim 1, wherein the at least one desired delivery goal comprises at least one of a desired delivery date, a desired cost, a desired discount, or a desired delivery speed of the automation mailing of the first plurality of mailpieces.

4. The method of claim 1, wherein the first plurality of mailers includes mailers other than the customer and the specific mailer and tracking data for automation mailings of the second plurality of mailpieces sent by the mailers other than the customer and the specific mailer are inaccessible by the customer and the specific mailer.

5. The method of claim 1, wherein the tracking data include at least one of tracking data for a first portion of the automation mailings of the second plurality of mailpieces that have arrived at destinations or tracking data for a second portion of the automation mailings of the second plurality of mailpieces that are en route to the destinations.

6. The method of claim 1, wherein the computer-readable indicia is selected from the group consisting of a barcode, a Quick Response (QR) code, and a radio-frequency identification tag.

7. The method of claim 1, wherein the drop plan further includes, for the each portion of the mailpieces of the first plurality of mailpieces, a drop location.

8. The method of claim 7, wherein the specific mailer is a second plurality of mailers, each mailer of the second plurality of mailers is associated with at least one portion of the mailpieces of the first plurality of mailpieces.

9. The method of claim 1, wherein the form of the drop plan comprises an interchange file.

10. The method of claim 1, wherein the receiving the at least one desired delivery goal is performed before, after, or contemporaneously with the receiving the tracking data.

11. The method of claim 9, wherein the interchange file has a code that uniquely identifies a sender of the first plurality of mailpieces.

12. A non-transitory computer-readable medium storing computer code for controlling a processor to cause the processor to execute instructions to:

receive, via a network and from a communication system of a customer, at least one desired delivery goal for an automation mailing of a first plurality of mailpieces for the customer;

receive tracking data for automation mailings of a second plurality of mailpieces sent by a first plurality of mailers, the tracking data obtained from automatically-scanned computer-readable indicia disposed on each of the second plurality of mailpieces;

determine, based on the tracking data, estimated delivery times between locations;

generate, based on the estimated delivery times and the at least one desired delivery goal, a drop plan for the automation mailing of the first plurality of mailpieces, the drop plan including, for each portion of the mailpieces of the first plurality of mailpieces, a drop date; and transmit, via the network and to a commercial printer associated with a specific mailer, the drop plan, the drop plan having a form configured to be received by a control system of the commercial printer and to be used by the control system to control operation of the commercial printer to print the first plurality of mailpieces in a first duration of time, the first duration of time being longer than a second duration of time, the second duration of time being a duration of time of operation of the commercial printer to print the first plurality of mailpieces in an absence of the drop plan.

13. A system comprising:

an input circuit configured to receive, via a network and from a communications system of a customer, at least one desired delivery goal for an automation mailing of a first plurality of mailpieces for the customer, and to receive tracking data for automation mailings of a second plurality of mailpieces sent by a first plurality of mailers, the tracking data obtained from automatically-scanned computer-readable indicia disposed on each of the second plurality of mailpieces;

a processor configured to determine, based on the tracking data, estimated delivery times between locations, and to generate, based on the estimated delivery times and the at least one desired delivery goal, a drop plan for the automation mailing of the first plurality of mailpieces, the drop plan including, for each portion of the mailpieces of the first plurality of mailpieces, a drop date; and an output circuit configured to transmit, via the network and to a commercial printer associated with a specific mailer, the drop plan, the drop plan having a form configured to be received by a control system of the commercial printer and to be used by the control system to control operation of the commercial printer to print the first plurality of mailpieces in a first duration of time, the first duration of time being longer than a second duration of time, the second duration of time being a duration of time of operation of the commercial printer to print the first plurality of mailpieces in an absence of the drop plan.

14. The system of claim 13, wherein at least one of the input circuit or the output circuit is an application-specific integrated circuit.

15. The system of claim 13, wherein the at least one desired delivery goal comprises at least one of a desired delivery date, a desired cost, a desired discount, or a desired delivery speed of the automation mailing of the first plurality of mailpieces.

16. The system of claim 13, wherein the tracking data include at least one of tracking data for a first portion of the automation mailings of the second plurality of mailpieces that have arrived at destinations or tracking data for a second portion of the automation mailings of the second plurality of mailpieces that are en route to the destinations.

17. The system of claim 13, wherein the computer-readable indicia is selected from the group consisting of a barcode, a Quick Response (QR) code, and a radio-frequency identification tag.

18. The system of claim 13, wherein the drop plan further includes, for the each portion of the mailpieces of the first plurality of mailpieces, a drop location.

19. The system of claim 13, wherein the form of the drop plan comprises an interchange file.

20. The system of claim 19, wherein the interchange file has a code that uniquely identifies a sender of the first plurality of mailpieces.

21. A method comprising:

receiving, at a forecast system, via a network, and from a communications system of a customer, at least one desired delivery goal for an automation mailing of a first plurality of mailpieces for the customer;

receiving, at the forecast system, tracking data for automation mailings of a second plurality of mailpieces sent by a first plurality of mailers, the tracking data obtained from automatically-scanned computer-readable indicia disposed on each of the second plurality of mailpieces;

determining, by the forecast system and based on the tracking data, estimated delivery times between locations;

generating, by the forecast system and based on the estimated delivery times and the at least one desired delivery goal, a drop plan for the automation mailing of the first plurality of mailpieces, the drop plan including, for each portion of the mailpieces of the first plurality of mailpieces, a drop date and a drop location;

transmitting, from the forecast system, via the network, and to a commercial printer associated with a specific mailer, the drop plan, the drop plan having a form configured to be received by a control system of the commercial printer and to be used by the control system to control operation of the commercial printer to print the first plurality of mailpieces in at least one of:

a manner that precludes a need to sort the mailpieces of the first plurality of mailpieces; or a first duration of time, the first duration of time being longer than a second duration of time, the second duration of time being a duration of time of operation of the commercial printer to print the first plurality of mailpieces in an absence of the drop plan, the specific mailer being a second plurality of mailers, each mailer of the second plurality of mailers being associated with at least one portion of the mailpieces of the first plurality of mailpieces, wherein:

the drop plan comprises a first portion of the drop plan and a second portion of the drop plan;

the drop location comprises a first drop location and a second drop location;

the first plurality of mailpieces comprises a first portion of the first plurality of mailpieces and a second portion of the first plurality of mailpieces;

the commercial printer associated with the specific mailer comprises a first commercial printer associated with a first specific mailer and a second commercial printer associated with a second specific mailer; and the transmitting comprises:
- transmitting, from the forecast system, via the network, and to the first commercial printer associated with the first specific mailer, the first portion of the drop plan, the first portion of the drop plan having the form configured to be received by the control system of the first commercial printer and to be used by the control system of the first commercial printer to print the first portion of the first plurality of mailpieces in at least one of:
  - the manner that precludes the need to sort the mailpieces of the first portion of the first plurality of mailpieces; or
  - the first duration of time, the first duration of time being longer than the second duration of time, the second duration of time being the duration of time of operation of the first commercial printer to print the first portion of the first plurality of mailpieces in the absence of the first portion of the drop plan; and
- transmitting, from the forecast system, via the network, and to the second commercial printer associated with the second mailer, the second portion of the drop plan, the second portion of the drop plan having the form configured to be received by the control system of the second commercial printer and to be used by the control system of the second commercial printer to print the second portion of the first plurality of mailpieces in at least one of:
  - the manner that precludes the need to sort the mailpieces of the second portion of the first plurality of mailpieces; or
  - a third duration of time, the third duration of time being longer than a fourth duration of time, the fourth duration of time being the duration of time of operation of the second commercial printer to print the second portion of the first plurality of mailpieces in the absence of the second portion of the drop plan.

22. A system comprising:

an input circuit configured to receive, via a network and from a communications system of a customer, at least one desired delivery goal for an automation mailing of a first plurality of mailpieces for the customer, and to receive tracking data for automation mailings of a second plurality of mailpieces sent by a first plurality of mailers, the tracking data obtained from automatically-scanned computer-readable indicia disposed on each of the second plurality of mailpieces;

a processor configured to determine, based on the tracking data, estimated delivery times between locations, and to generate, based on the estimated delivery times and the at least one desired delivery goal, a drop plan for the automation mailing of the first plurality of mailpieces, the drop plan including, for each portion of the mailpieces of the first plurality of mailpieces, a drop date; and an output circuit configured to transmit, via the network and to a commercial printer associated with a specific mailer, the drop plan, the drop plan having a form configured to be received by a control system of the commercial printer and to be used by the control system to control operation of the commercial printer to print the first plurality of mailpieces in at least one of:
a manner that precludes a need to sort the mailpieces of the first plurality of mailpieces; or a first duration of time, the first duration of time being longer than a second duration of time, the second duration of time being a duration of time of operation of the commercial printer to print the first plurality of mailpieces in an absence of the drop plan, wherein:

the drop plan comprises a first portion of the drop plan and a second portion of the drop plan;

the first portion of the drop plan comprises a first drop location;

the second portion of the drop plan comprises a second drop location;

the first plurality of mailpieces comprises a first portion of the first plurality of mailpieces and a second portion of the first plurality of mailpieces;

the commercial printer associated with the specific mailer comprises a first commercial printer associated with a first specific mailer and a second commercial printer associated with a second specific mailer; and the output circuit is configured to transmit by:
- transmitting, via the network and to the first commercial printer associated with the first specific mailer, the first portion of the drop plan, the first portion of the drop plan having the form configured to be received by the control system of the first commercial printer and to be used by the control system of the first commercial printer to print the first portion of the first plurality of mailpieces in at least one of:
  - the manner that precludes the need to sort the mailpieces of the first portion of the first plurality of mailpieces; or
  - the first duration of time, the first duration of time being longer than the second duration of time, the second duration of time being the duration of time of operation of the first commercial printer to print the first portion of the first plurality of mailpieces in the absence of the first portion of the drop plan; and
- transmitting, via the network and to the second commercial printer associated with the second mailer, the second portion of the drop plan, the second portion of the drop plan having the form configured to be received by the control system of the second commercial printer and to be used by the control system of the second commercial printer to print the second portion of the first plurality of mailpieces in at least one of:
  - the manner that precludes the need to sort the mailpieces of the second portion of the first plurality of mailpieces; or
  - a third duration of time, the third duration of time being longer than a fourth duration of time, the fourth duration of time being the duration of time of operation of the second commercial printer to print the second portion of the first plurality of mailpieces in the absence of the second portion of the drop plan.

\* \* \* \* \*